(12) United States Patent
Duff et al.

(10) Patent No.: US 10,041,846 B2
(45) Date of Patent: *Aug. 7, 2018

(54) ROTARY FORCE DIAGNOSTIC TOOLS AND METHODS

(71) Applicant: HONDA MOTOR CO., LTD., Minato-ku, Tokyo (JP)

(72) Inventors: Douglas Duff, Marysville, OH (US); Andrew Sweigart, Grove City, OH (US); Evan Yarrington, Raymond, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/469,155

(22) Filed: Mar. 24, 2017

(65) Prior Publication Data

US 2017/0199094 A1 Jul. 13, 2017

Related U.S. Application Data

(63) Continuation-in-part of application No. 14/804,183, filed on Jul. 20, 2015.

(51) Int. Cl.
*G01N 3/00* (2006.01)
*G01L 5/22* (2006.01)
*B62D 5/04* (2006.01)

(52) U.S. Cl.
CPC .......... *G01L 5/221* (2013.01); *B62D 5/0457* (2013.01)

(58) Field of Classification Search
CPC .............................. G01L 5/221; B62D 5/0457

USPC ........................................................... 73/788
See application file for complete search history.

(56) References Cited

U.S. PATENT DOCUMENTS

| | | |
|---|---|---|
| 3,556,045 A | 1/1971 | Williams |
| 3,889,527 A | 6/1975 | Wallace |
| 4,281,538 A | 8/1981 | Dudek |
| 4,386,532 A | 6/1983 | Benjamin |
| 4,742,720 A | 5/1988 | Storck |
| 4,803,629 A | 2/1989 | Noto et al. |
| 5,123,497 A | 6/1992 | Yopp et al. |
| 5,283,508 A | 2/1994 | Komatsu |
| 5,610,577 A | 3/1997 | Hwang |
| 6,089,344 A | 7/2000 | Baughn et al. |
| 6,114,949 A | 9/2000 | Schmitz et al. |
| 6,155,106 A | 12/2000 | Sano |
| 6,219,603 B1 | 4/2001 | Yamamoto et al. |
| 6,253,630 B1 | 7/2001 | Hacker |
| 6,305,217 B1 | 10/2001 | Mansfield et al. |
| 6,473,160 B2 | 10/2002 | Suzuki et al. |

(Continued)

*Primary Examiner* — Max Noori
(74) *Attorney, Agent, or Firm* — Arent Fox LLP

(57) ABSTRACT

An apparatus includes a force sensor including a housing and a support coupled to the housing, where the apparatus can couple to a rotary component. The housing also includes a handle coupled to the support to facilitate applying a force to the apparatus. The apparatus further includes an angular position sensor to sense rotation related to the apparatus, which can include a rotation of the rotary component to which the apparatus is coupled, a relative rotation between the housing and the handle, where the handle is rotatably coupled to the housing, and/or the like. The apparatus also includes a force sensor enabled to measure an amount of force applied to the handle.

20 Claims, 12 Drawing Sheets

(56) References Cited

U.S. PATENT DOCUMENTS

| | | |
|---|---|---|
| 6,510,760 B2 | 1/2003 | Schlabach et al. |
| 7,575,089 B2 | 8/2009 | Sherwin |
| 7,793,556 B2 | 9/2010 | Engel et al. |
| 2006/0011404 A1 | 1/2006 | Goto et al. |
| 2006/0243464 A1 | 11/2006 | Heinz |
| 2008/0096445 A1 | 4/2008 | Nanami |
| 2008/0251312 A1 | 10/2008 | Goto et al. |
| 2013/0294016 A1* | 11/2013 | Wilson ............ A63F 13/211 361/679.01 |
| 2014/0290386 A1 | 10/2014 | Wang et al. |
| 2015/0011830 A1* | 1/2015 | Hunter ............ A61B 1/0052 600/118 |
| 2015/0366585 A1* | 12/2015 | Lemay ............ A61B 17/50 607/129 |

* cited by examiner

ROTARY FORCE DIAGNOSTIC TOOLS AND METHODS

CLAIM OF PRIORITY UNDER 35 U.S.C. § 119

The present Application for Patent is a continuation-in-part of patent application Ser. No. 14/804,183 entitled "ROTARY FORCE DIAGNOSTIC TOOLS AND METHODS" filed Jul. 20, 2015, which is assigned to the assignee hereof and hereby expressly incorporated by reference herein for all purposes.

BACKGROUND

The subject matter disclosed herein relates to vehicle tests and, more particularly, to rotary force diagnostic tools and methods.

During manufacturing of a vehicle, components of the vehicle are tested to determine if the components function in accordance with industry and/or quality standards. For example, one or more characteristics and/or parameters of turn signals, windshield wipers, a steering wheel, brakes, an engine, and/or other components may be determined and/or analyzed.

SUMMARY

According to one aspect, an apparatus includes a force sensor for coupling to a rotary component. The apparatus also includes a handle rotatably coupled to the force sensor to enable the force sensor to sense an amount of force applied to the handle. Additionally, the apparatus includes an angular position sensor for coupling to the rotary component to sense an angular position of the rotary component, and an output device to output at least one of the amount of force applied to the handle, the angular position of the rotary component, or a representation of a combination thereof.

According to another aspect, a method includes coupling a rotary force diagnostic tool to a rotary component, and applying a force to a handle of the rotary force diagnostic tool to rotate the rotary component from a first position to a second position. The method also include determining an angular position of the rotary component as the rotary component rotates from the first position to the second position, and determining an amount of force applied to the handle when the rotary component is in the angular position. Further, the method includes outputting at least one of the amount of force applied to the handle, the angular position of the rotary component, or a representation of a combination thereof.

According to another aspect, a non-transitory computer-readable medium is provided including computer-executable code. The code includes code for determining, from an angular position sensor of a rotary force diagnostic tool coupled to a rotary component, an angular position of the rotary component as the rotary component rotates from a first position to a second position, code for determining, from a force sensor of the rotary force diagnostic tool, an amount of force applied to a handle of the rotary component when the rotary component is in the angular position, and code for outputting at least one of the amount of force applied to the handle, the angular position of the rotary component, or a representation of a combination thereof.

BRIEF DESCRIPTION OF THE DRAWINGS

Like reference numerals are used herein to refer to like components and/or systems.

DETAILED DESCRIPTION

Example rotary force diagnostic tools and methods are disclosed herein. An example rotary force diagnostic tool may be employed to determine an amount of force applied to rotate a rotary component (e.g., a steering wheel) from a first position to a second position. For example, as the rotary component rotates, the rotary force diagnostic tool may determine angular positions of the rotary component and a force applied to the rotary component at each of the angular positions. Thus, the rotary force diagnostic tool may indicate if the force applied to rotate the rotary component increases, decreases, and/or is substantially constant as the rotary component rotates from the first position to the second position.

In some aspects, the rotary force diagnostic tool may include a fixture to removably couple the rotary force diagnostic tool to the rotary component. In some aspects, the rotary force diagnostic tool includes a force sensor (e.g., a load cell) and an angular position sensor (e.g., a rotary encoder, a gyroscope, etc.). The force sensor may be non-rotatably coupled to the fixture, and a handle may be rotatably coupled to the force sensor. The angular position sensor may be disposed on the rotary component, between the force sensor and the handle or otherwise attached relative to the force sensor and/or handle, or in substantially any configuration such to facilitate sensing of an angular position of the rotary component, an angular position of the handle relative to the force sensor, etc.

Figure 1A:
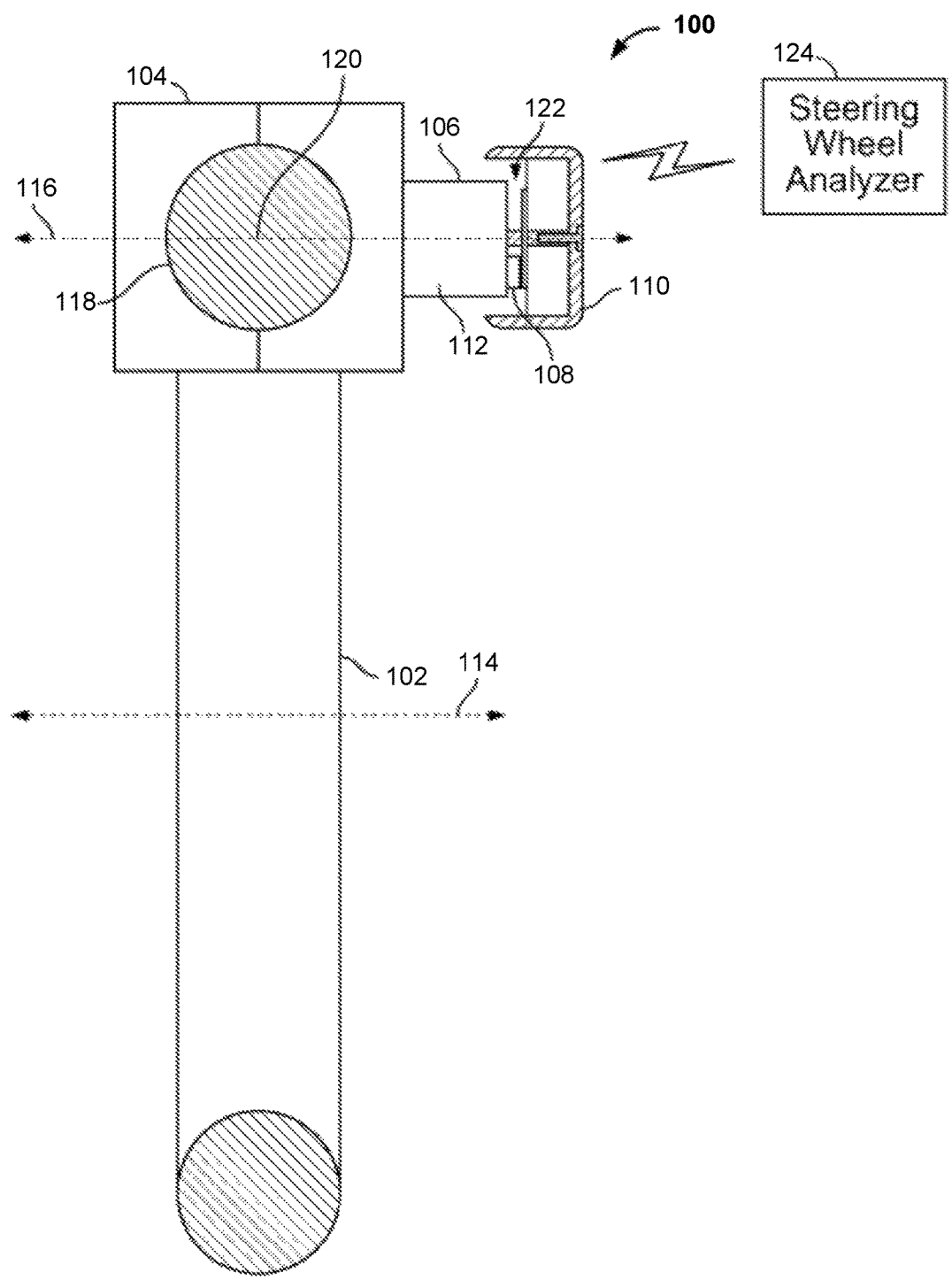
FIGS. 1A and 1B are schematic cross-sectional views of an example rotary force diagnostic tools disclosed herein.
Figure 1B:
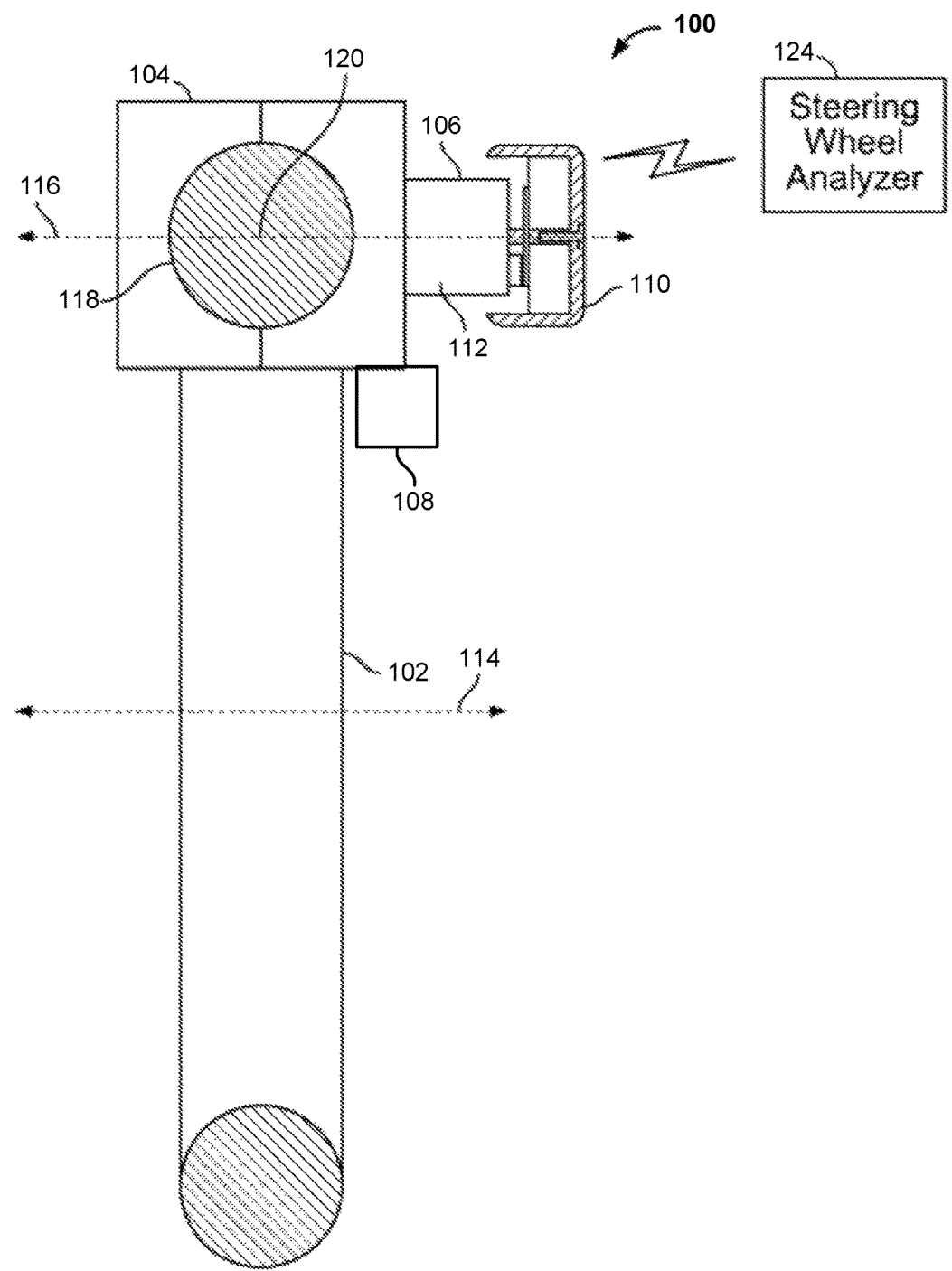

FIGS. 1A and 1B are schematic cross-sectional views of an example rotary force diagnostic tool 100 disclosed herein. The rotary force diagnostic tool 100 of FIGS. 1A and 1B are coupled to a steering wheel 102. Although the following aspects are described in conjunction with the steering wheel 102, the rotary force diagnostic tools disclosed herein may be employed to determine a force to rotate any component that rotates, turns, and/or swivels such as, for example, a wheel or a seat. In the aspects shown in FIGS. 1A and 1B, the rotary force diagnostic tool 100 includes a mount or fixture 104, a force sensor 106, an angular position sensor 108, and a handle 110.

Figure 2:
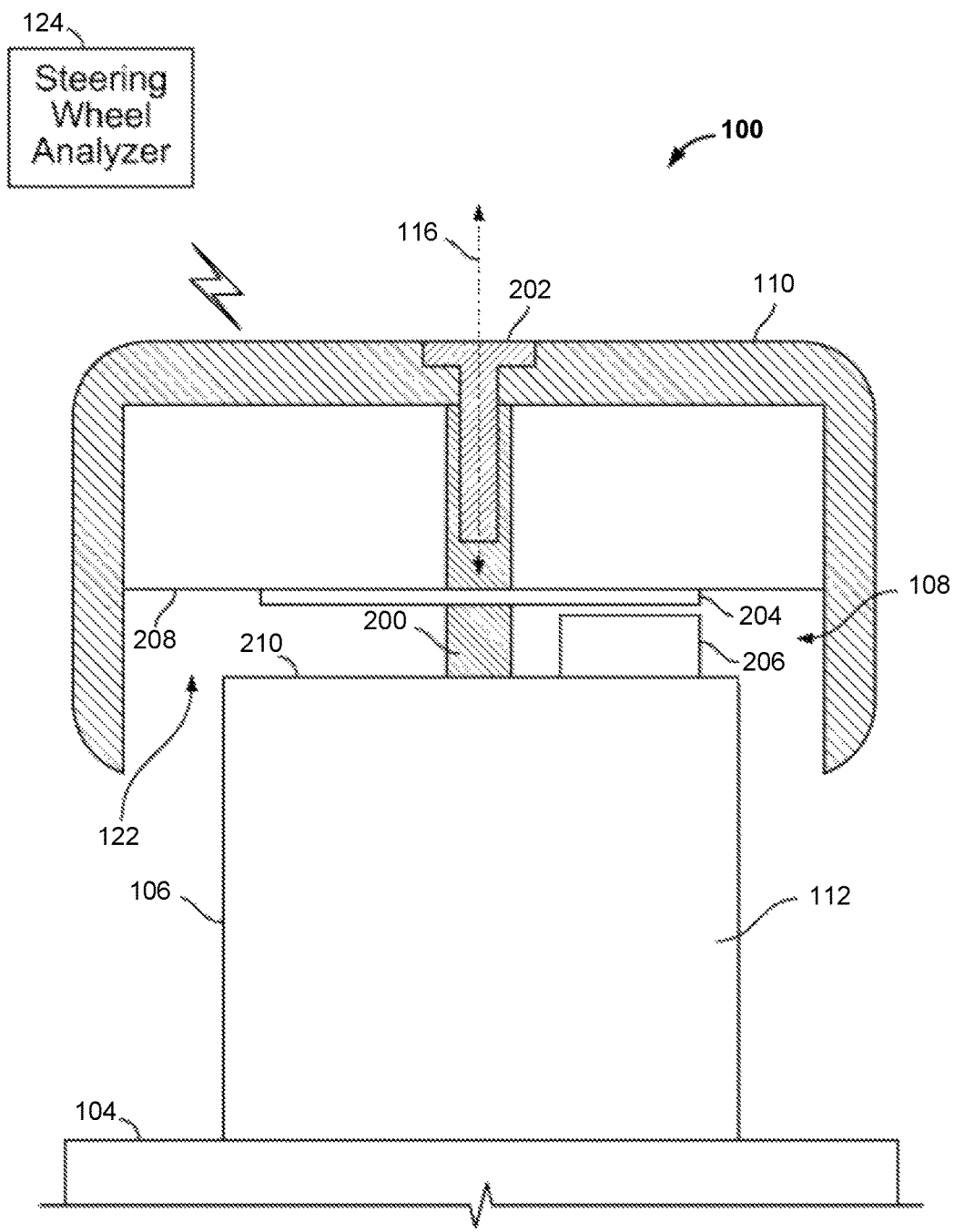
FIG. 2 is another schematic cross-sectional view of the example rotary force diagnostic tool of FIG. 1.

The fixture 104 removably couples the rotary force diagnostic tool 100 to the steering wheel 102. In the aspects of FIGS. 1A and 1B, the fixture 104 supports the force sensor 106, the angular position sensor 108, and the handle 110 on the steering wheel 102. The fixture 104 of FIG. 2 is coupled to the steering 102 to enable the fixture 104 to rotate with the steering wheel 102 and substantially without movement relative to the steering wheel 102 (i.e., without any intended play or lost motion between the steering wheel 102 and the fixture 104).

The fixture 104 may be removably coupled to the steering wheel 102 in any suitable way. For example, the fixture 104 may clamp to the steering wheel 102, hook, clip, and/or grip onto the steering wheel 102, be tied to the steering wheel 102, employ one or more magnets to secure the fixture 104 to the steering wheel 102, and/or couple to the steering wheel 102 in one or more additional and/or alternative ways. In some aspects, the fixture 104 couples to the steering wheel 102 in a nondestructive or harmless manner. For example, the fixture 104 may employ padding, one or more smooth contact surfaces, one or more mechanisms to prevent over-tightening of the fixture 104 onto the steering wheel 102, and/or one or more additional and/or alternative techniques and/or components to enable the fixture 104 to be coupled to and decoupled from the steering wheel 102 without permanently scratching, scraping, cutting, bending, denting, deforming, discoloring, and/or harming the steering wheel 102 in any additional and/or alternative ways.

The force sensor 106 of FIGS. 1A and 1B includes a housing 112 coupled to the fixture 104 such that the force sensor 106 moves with the fixture 104 and substantially without movement relative to the fixture 104. Thus, the steering wheel 102, the fixture 104, and the housing 112 each rotate only about a first axis of rotation 114 when the rotary force diagnostic tool 100 is coupled to the steering wheel 102. In some aspects, the first axis of rotation 114 is defined by a steering shaft of a steering column of a vehicle in which the steering wheel 102 is employed. The housing 112 may be coupled to the fixture 104 by one or more mechanical and/or chemical fasteners such as, for example, a bolt, a weld, a screw, a nail, glue, epoxy, a clip, and/or one or more additional and/or alternative fasteners.

In the aspects shown in FIGS. 1A and 1B, the handle 110 is a cylindrical knob. However, the handle 110 may have any suitable shape and/or configuration such as, for example, an L-shape as described below with reference to FIGS. 4 and 5. The handle 110 can be rotatably coupled to the housing 112 of the force sensor 106. In the aspects of FIGS. 1A and 1B, the handle 110 can rotate relative to the housing 112 about a second axis of rotation 116. Thus, in an aspect, as the steering wheel 102 rotates, the handle 110 may rotate about the first axis of rotation 114 and the second axis of rotation 116. In another aspect, the handle 110 may not rotate and/or may be fixedly coupled to the housing 112 of the force sensor 106.

In the shown aspect, the fixture 104 is coupled to the steering wheel 102 to orient the rotary force diagnostic tool 100 such that the second axis of rotation 116 is substantially parallel to the first axis of rotation 114. In other aspects, the second axis of rotation 116 is not substantially parallel to the first axis of rotation 114. The perspectives of FIGS. 1A and 1B are from a viewpoint substantially perpendicular to a plane passing through the first axis of rotation 114 of the steering wheel 102. The steering wheel 102 has a circular cross-sectional area 118 from the perspective of FIGS. 1A and 1B. In other aspects, the steering wheel 102 has other cross-sectional shapes (e.g., rectangular, polygonal, etc.). In the aspects of FIGS. 1A and 1B, the fixture 104 is coupled to the steering wheel 102 to orient the rotary force diagnostic tool 100 such that the second axis of rotation 116 passes through (i.e., intersects) a center 120 of the circular cross-sectional area 118 of the steering wheel 102. In other aspects, the second axis of rotation 116 does not pass through the center 120 of the circular cross-sectional area 118 of the steering wheel 102.

In the aspect of FIG. 1A, the handle 110 is spaced apart from the housing 112 of the force sensor 106 along the second axis of rotation 116. The angular position sensor 108 is disposed in a space 122 between the housing 112 and the handle 110. The angular position sensor 108 senses relative movement (i.e., rotation) between the housing 112 and the handle 110, which corresponds to relative movement between the handle 110 and the steering wheel 102. For example, during a steering wheel test, a user may grip the handle 110 and apply a force to the handle 110 to rotate the steering wheel 102. In some aspects, as the steering wheel 102 rotates, the user maintains the handle 110 in a predetermined orientation such as, for example, a predetermined angular position relative to a reference position. As a result, the handle 110 rotates relative to the housing 112 as the steering wheel 102 rotates. The angular position sensor 108 senses the relative movement between the housing 112 and the handle 110. Further, as the user applies the force to the handle 110 to rotate the steering wheel 102, the force sensor 106 senses an amount of force applied by the user to the handle 110.

In another aspect of FIG. 1B, the angular position sensor 108 may be disposed on or attached to the fixture 104. In this aspect, the angular position sensor 108 may be disposed in substantially any configuration relative to the steering wheel 102 (e.g., attached to the steering wheel 102, attached to housing 112, etc. such that the angular position sensor 108 rotates with the steering wheel 102). In this aspect, the angular position sensor 108 may include a gyroscope that measures angular rotation of itself (and thus of the steering wheel 102). For example, during a steering wheel test, a user may grip the handle 110 and apply a force to the handle 110 to rotate the steering wheel 102. In this aspect, the user may operate the handle 110 regardless of an orientation or predetermined angular position, and the angular position sensor 108 (e.g., as or including a gyroscope) can measure the relative change in angular position. In this aspect, for example, the handle 110 may be fixedly coupled to the housing 112 of the force sensor 106, as described above, and the angular position sensor 108 positioned on the fixture 104 or otherwise relative to the steering wheel 102 can provide information regarding the angular position of the steering wheel 102, force sensor 106, etc. (e.g., relative to axis of rotation 114). In alternative embodiments, the angular position sensor 108 may include any other device that measures the rotation of the steering wheel 102 regardless of the angular position of the handle 110. As described above, as the user applies the force to the handle 110 to rotate the steering wheel 102, the force sensor 106 senses an amount of force applied to the handle 110 (e.g., by the user, by a mechanical testing device, etc.).

In the aspects of FIGS. 1A and 1B, the force sensor 106 and the angular position sensor 108 are communicatively coupled to a steering wheel analyzer 124. In some aspects, the force sensor 106 communicates force information to the steering wheel analyzer 124, and the angular position sensor 108 communicates angular position information to the steering wheel analyzer 124. In the aspects of FIGS. 1A and 1B, the force sensor 106 and/or the angular position sensor 108 are wirelessly communicatively coupled to the steering wheel analyzer 124. In other aspects, one or more wires communicatively couple the force sensor 106 and/or the angular position sensor 108 to the steering wheel analyzer 124. As described in greater detail below with reference to FIG. 7, the steering wheel analyzer 124 may determine an amount of force applied to the handle 110 to rotate the steering wheel 102, an angular position of the steering wheel 102, and/or additional and/or alternative information based on the force information and/or the angular position information. Moreover, steering wheel analyzer 124 may be a supplemental diagnostic tool, for example, but not limited to, a line end tester. Alternatively, the steering wheel analyzer 124 may be any type of controller/processor that allows rotary force diagnostic tool 100 to function as described herein.

FIG. 2 is a schematic cross-sectional view of the rotary force diagnostic tool 100 of FIG. 1. In the aspect of FIG. 2, the force sensor 106 is a load cell. In other aspects, the force sensor 106 may be any suitable type of force sensor. The force sensor 106 of FIG. 2 includes a support 200 non-rotatably coupled to the housing 112. In the aspect of FIG. 2, the support 200 is a cylindrical stem or shaft. In other aspects, the support 200 may have any suitable shape and/or configuration. The support 200 extends from the housing 112 toward the handle 110 and away from the fixture 104. The handle 110 is rotatably coupled to the support 200 via a fastener 202 (e.g., a rivet) to enable the handle 110 to rotate relative to the support 200 and, thus, the housing 112. In the aspect of FIG. 2, the fastener 202 defines the second axis of rotation 116 of the handle 110 relative to the housing 112.

The support 200 is operatively coupled to the housing 112 to enable the force sensor 106 to sense an amount of force applied to the support 200. For example, when the user applies a force to the handle 110 to rotate the steering wheel 102, the force is transferred to the support 200, which may change an electrical output of the force sensor 106 such as, for example, a voltage or an electrical resistance. The electrical output may then be communicated to the steering wheel analyzer 124 as the force information.

The angular position sensor 108 senses rotation of the handle 110 relative to the housing 112. In the shown aspect, the angular position sensor 108 is a rotary encoder. In other aspects, the angular position sensor 108 may be any suitable type of rotary encoder such as, for example, an optical rotary encoder, a magnetic rotary encoder, an absolute rotary encoder, an incremental rotary encoder, and/or any other suitable type of rotary encoder. In other aspects, the angular position sensor 108 may be implemented using one or more additional and/or alternative types of sensors.

In the shown aspect, the angular position sensor 108 includes a rotary encoder wheel 204 and a rotary encoder sensor 206. In some aspects, the rotary encoder sensor 206 senses an angular position of the rotary encoder wheel 204 based on one or more indicators of the rotary encoder wheel 204 such as, for example, an optical pattern, magnetic fields, and/or one or more additional and/or alternative types of indicators. In the aspect of FIG. 2, the rotary encoder wheel 204 is disposed on the handle 110. More particularly, the rotary encoder wheel 204 of FIG. 2 is disposed about the support 200 (e.g., the support 200 passes through an aperture of the rotary encoder wheel 204) and is coupled to a first face or surface 208 of the handle 110 opposing a second face or surface 210 of the housing 112 of the force sensor 106. In some aspects, the handle 110 does not include the rotary encoder wheel 204 and the indicators are disposed directly on the first surface 208. For example, an optical pattern readable by the rotary encoder sensor 206 may be printed onto the first surface 208. The rotary encoder sensor 206 is disposed on and coupled to the second surface 210 of the housing 112 of the force sensor 106. In other aspects, the rotary encoder sensor 206 is disposed on the first surface 208 of the handle 110, and the rotary encoder wheel 204 and/or the indicators are disposed on the second surface 210 of the housing 112. In some aspects, the rotary encoder wheel 204 and/or the rotary encoder sensor 206 may be disposed on other locations and/or in other orientations.

Figure 3:
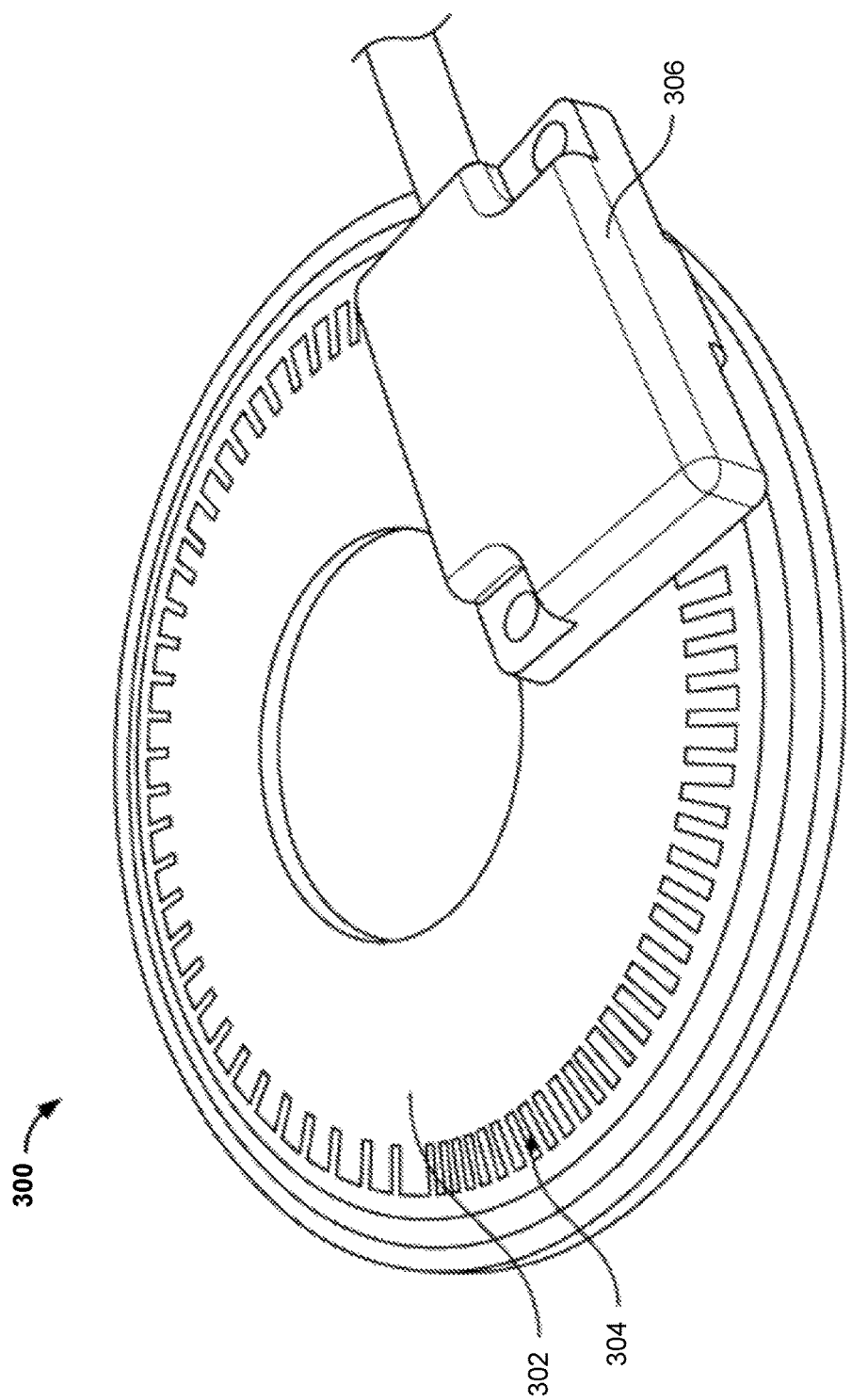
FIG. 3 is perspective view of an example rotary encoder, which may be used to implement the example rotary force diagnostic tool of FIGS. 1 and 2.

FIG. 3 is a perspective view of an example rotary encoder 300, which may be used to implement the angular position sensor 108 of FIGS. 1A, 1B, and 2. In the aspect of FIG. 3, the rotary encoder 300 is an absolute rotary encoder such as, for example, a Micro Motion Absolute™ rotary encoder sold by MicroE Systems®. The rotary encoder 300 of FIG. 3 may have a sensing resolution of between about 5 micrometers to about 1.2 nanometers when the handle 110 is moving up to a maximum angular speed of 10 meters per second relative to the housing 112. However, the above-noted resolution is merely an example and, thus, rotary encoders having other resolutions may be employed without departing from the scope of this disclosure. In the aspect of FIG. 3, the rotary encoder 300 includes a rotary encoder wheel 302 having a plurality of indicators 304. The rotary encoder 300 also includes a rotary encoder sensor 306, which optically senses one or more of the indicators 304 to generate angular position information.

Figure 4:
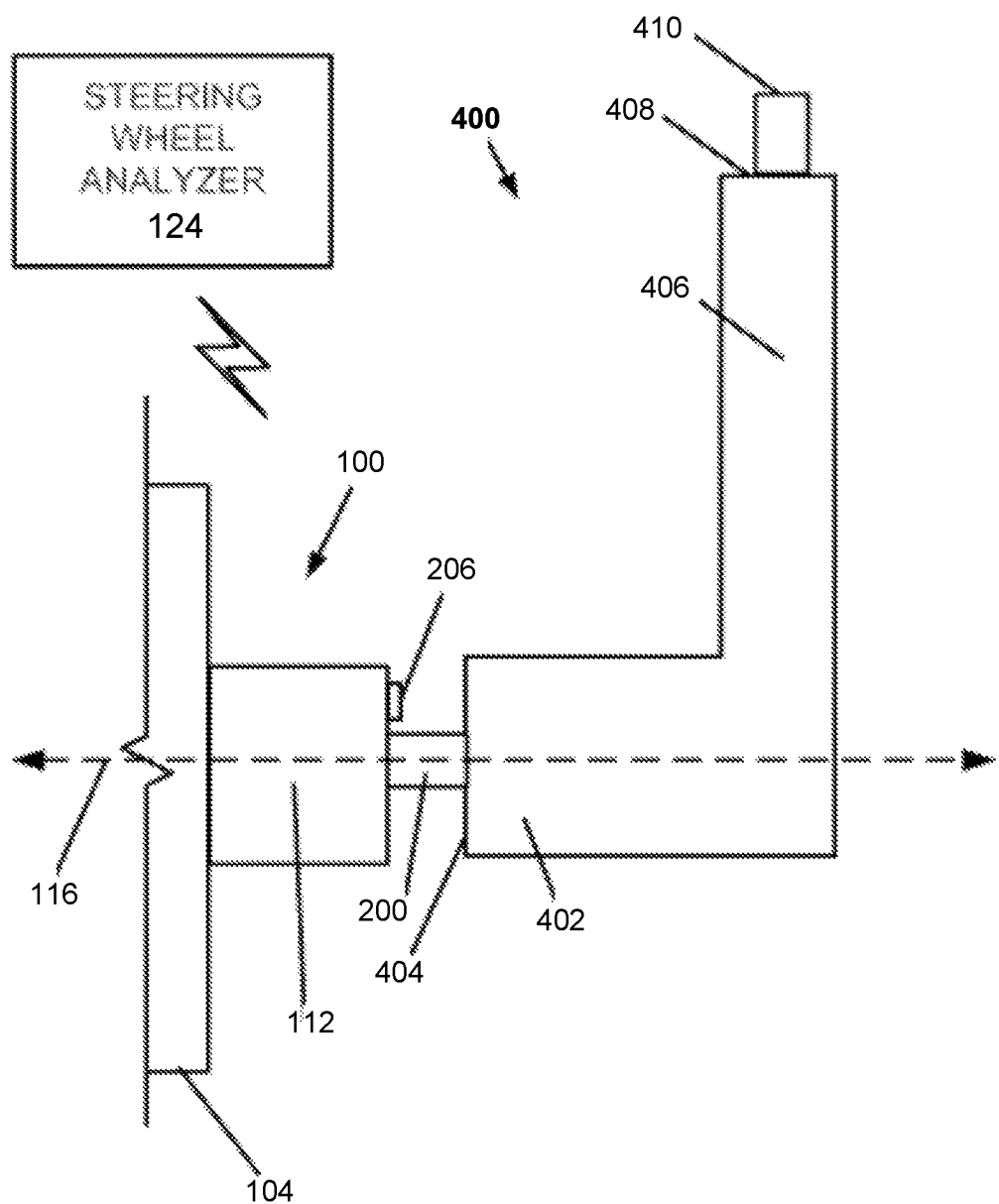
FIG. 4 is a schematic side view of the example rotary force diagnostic tool of FIGS. 1A, 1B, and 2 employing an L-shaped handle.

FIG. 4 is a side view of the rotary force diagnostic tool 100 employing another example handle 400. In the shown aspect, the handle 400 is L-shaped. Thus, the handle 400 includes a first section 402 defining a first end 404 of the handle 400 and a second section 406 defining a second end 408 of the handle 400. The first section 402 is substantially perpendicular to the second section 406. In other aspects, the handle 400 may have any suitable shape and/or configuration. For example, the handle 400 may be curved, X-shaped, and/or any other suitable shape and/or configuration. In the aspect of FIG. 4, the first end 404 is rotatably (or fixedly) coupled to the support 200 of the force sensor 106. Where the first end 404 is rotatably coupled to the support 200, rotary encoder sensor 206 can be provided to sense an angular position of the handle 400, though where the first end 404 is fixedly (e.g., not rotatably) coupled to the support 200, a different sensor (e.g., gyroscope or other rotary encode sensor, etc.) may be mounted on the fixture 104 and configured to provide information regarding angular position of the fixture 104 (e.g., relative to axis of rotation 114). As described in more detail with reference to FIG. 5, the handle 400 may include a visual indicator 410 to assist a user of the rotary force diagnostic tool 100 in maintaining the handle 400 in a predetermined orientation while rotating the steering wheel 102 via the handle 400.

Figure 5:
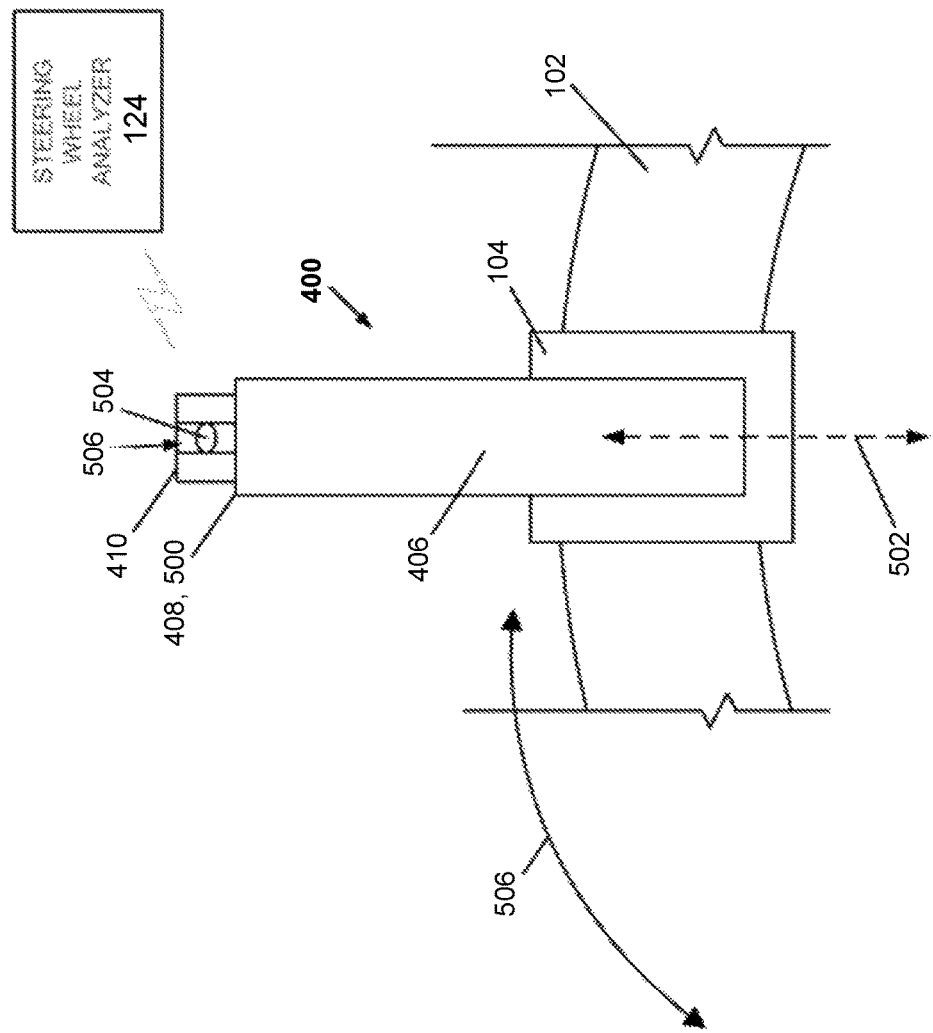
FIG. 5 is a schematic front view of the example rotary force diagnostic tool of FIGS. 1A, 1B, and 2 employing the L-shaped handle of FIG. 4.

FIG. 5 is a front view of the rotary force diagnostic tool 100 employing the handle 400 of FIG. 4. In the aspect of FIG. 5, the visual indicator 410 is a level (e.g., a bubble level) disposed on a surface 500 defining the second end 408 of the handle 400. During a steering wheel test employing the rotary force diagnostic tool 100 of FIG. 5, the user maintains the handle 400 in a predetermined orientation in which the surface 500 of the second end 408 is substantially horizontal to Earth or a support surface (e.g., a floor). In the aspect of FIG. 5, the predetermined orientation is also an orientation in which a longitudinal axis 502 of the second section 406 of the handle 400 is substantially vertical relative to Earth. The user may visibly monitor a bubble 504 inside the visual indicator 410 to assist the user in maintaining the handle 400 in the predetermined orientation as the user applies a force to the handle 400 to rotate the steering wheel 102 in a first direction (e.g., clockwise) or an opposite second direction (e.g., counterclockwise) as indicated by arrow 506. For example, the user may maintain handle 400 in the predetermined orientation by maintaining the bubble 504 in a middle or central section 506 of the visual indicator 410 as the steering wheel 102 rotates.

In some aspects, the rotary force diagnostic tool 100 may be calibrated before conducting a steering wheel test. For example, a reference position of the angular position sensor 108 may be set when the handle 400 and the steering wheel 102 are in respective predetermined positions. For example, the reference position may be set by zeroing the angular position sensor 108 when the second section 406 of the handle 400 is substantially vertical and the steering wheel 102 is in a straightened or neutral position. The angular position sensor 108 may then sense the angular position of the handle 400 relative to the reference position as the steering wheel 102 rotates relative to the handle 400. As used in this disclosure, the steering wheel 102 is in the straightened or neutral position when the steering wheel 102 is positioned such that wheels of a vehicle steered via the steering wheel 102 are oriented to direct the vehicle in a substantially straight line on a substantially level, smooth planar surface. In other aspects, the reference position of the angular position sensor 108 may correspond to other predetermined positions of the handle 400 and/or the steering wheel 102.

Figure 6:
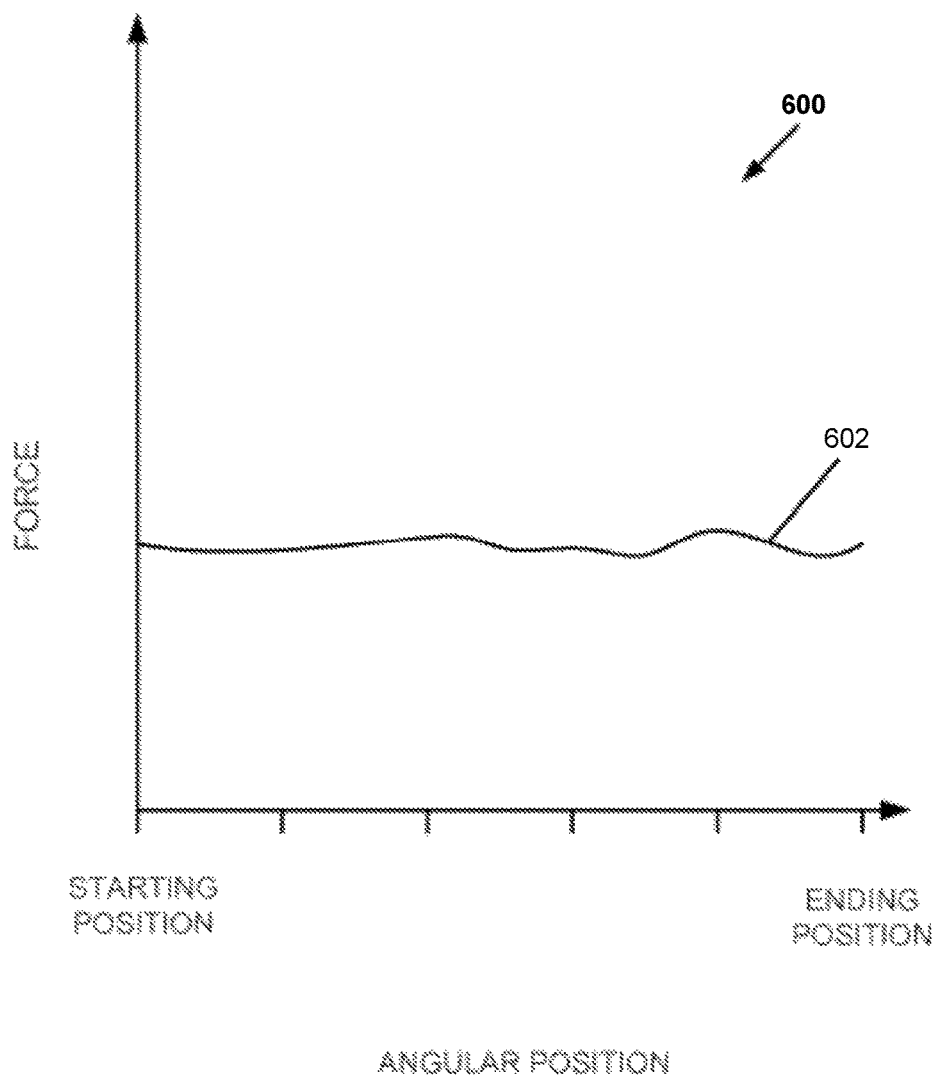
FIG. 6 is a graph of an example force profile of a steering wheel in accordance with the teachings of this disclosure.

FIG. 6 is a graph 600 illustrating an example force profile 602 of the steering wheel 102 generated by the example steering wheel analyzer 124 of FIGS. 1A, 1B, 2, 4, 5, and 8 based on force information and angular position information generated via the rotary force diagnostic tool 100. During a steering wheel test, the user rotates the steering wheel 102 from a first position to a second position by applying force to the handle 400 of the rotary force diagnostic tool 100. In some aspects, the user rotates the steering wheel 102 at a substantially constant angular speed from the first position to the second position while substantially maintaining the handle 400 in the predetermined orientation. As the steering wheel 102 rotates from the first position to the second position, the force sensor 106 senses amounts of force applied to the steering wheel 102, and the angular position sensor 108 senses angular positions of the handle 400 relative to the housing 112. As a result, the force sensor 106 and the angular position sensor 108 communicate force information and position information, respectively, to the steering wheel analyzer 124. Based on the force information and the position information, the steering wheel analyzer 124 associates (e.g., matches) positions of the steering wheel 102 with forces applied to the handle 400 at each of the positions to generate the force profile 602. In the aspect of FIG. 6, the force profile 602 is a plot of the forces applied to the handle 400 over the positions of the steering wheel 102 as the steering wheel 102 moves from the first position (e.g., a starting position) to the second position (e.g., an ending position). The force profile 602 may indicate, for example, if a force applied to rotate the steering wheel 102 is substantially constant, increases, and/or decreases as the steering wheel 102 moves from the first position to the second position.

Figure 7:
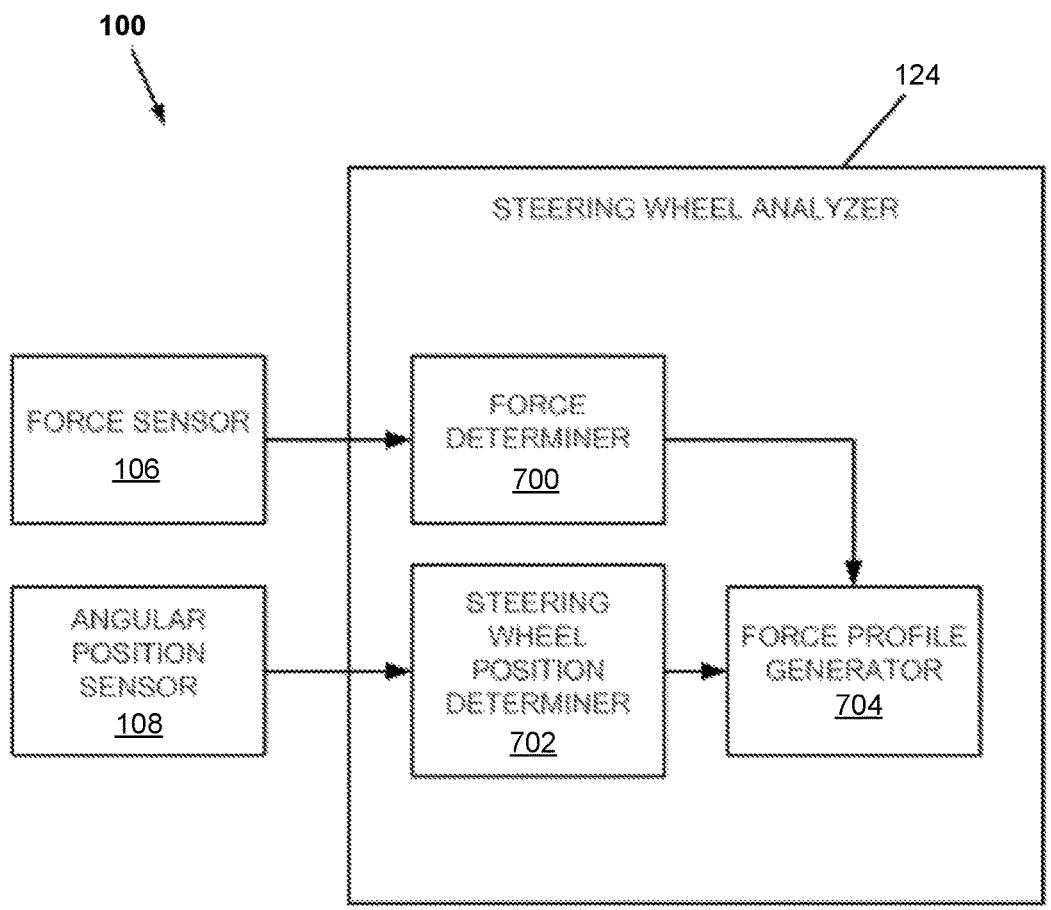
FIG. 7 is a block diagram of an example steering analyzer, which may be employed to generate the force profile of FIG. 6.

FIG. 7 is a block diagram of the example steering wheel analyzer 124 of FIGS. 1A, 1B, 2, 4, 5, and 8. In the aspect of FIG. 7, the steering wheel analyzer 124 includes a force determiner 700, a steering wheel position determiner 702, and a force profile generator 704. In the aspect of FIG. 7, the force determiner 700 receives force information from the force sensor 106 and determines one or more amounts of force applied to the handle 110, 400. The steering wheel position determiner 702 receives position information from the angular position sensor 108 and determines one or more positions of the steering wheel 102 based on the position information. The force profile generator 704 generates a force profile such as, for example, the force profile 602 of FIG. 6 based on the one or more amounts of force determined by the force determiner 700 and the one or more positions determined by the steering wheel position determiner 702.

While an example implementation of the rotary force diagnostic tool 100 is shown in FIG. 7, the rotary force diagnostic tool 100 may be implemented in other ways without departing from the scope of this disclosure. For example, one or more of the components and/or devices shown in FIG. 7 may be combined, divided, re-arranged, omitted, eliminated and/or implemented in one or more additional and/or alternative ways. For example, the force sensor 106, the angular position sensor 108, the force determiner 700, the steering wheel position determiner 702, the force profile generator 704, and/or, more generally, the steering wheel analyzer 124 of FIG. 7 may be implemented via hardware, software, and/or firmware. The force sensor 106, the angular position sensor 108, the force determiner 700, the steering wheel position determiner 702, the force profile generator 704, and/or, more generally, the steering wheel analyzer 124 of FIG. 7 may be implemented by one or more circuits, programmable processors, application specific integrated circuits (ASICs), programmable logic devices (PLDs) and/or field programmable logic devices (FPLDs), and/or one or more additional and/or alternative devices. At least one of the force sensor 106, the angular position sensor 108, the force determiner 700, the steering wheel position determiner 702, the force profile generator 704, and/or, more generally, the steering wheel analyzer 124 of FIG. 7 may include a tangible and/or non-transitory computer readable medium such as a memory, DVD, CD, etc. storing software and/or firmware. The rotary force diagnostic tool of FIG. 7 may include one or more additional and/or alternative components and/or devices and/or may include more than one of any or all of the components and/or devices.

Figure 8:
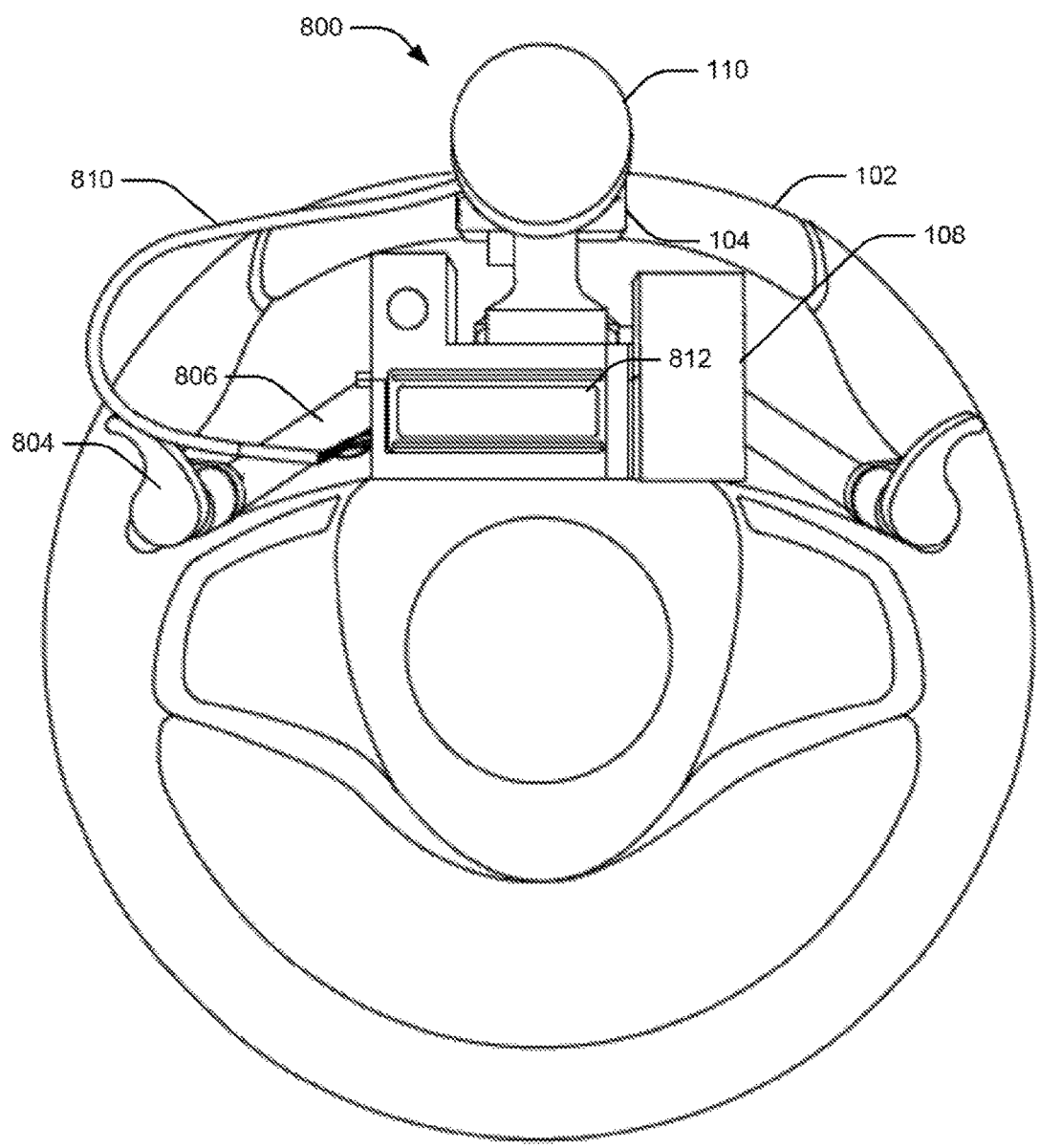
FIG. 8 is perspective view of an example rotary force diagnostic tool of FIG. 1B.

FIG. 8 is a perspective view of an example rotary force diagnostic tool 800 according to aspects described herein. Rotary force diagnostic tool 800 can be coupled to a steering wheel 102 or substantially any rotary component for which force over relative angular position can be measured. In an example, rotary force diagnostic tool 800 can include mounting hardware to mount the rotary force diagnostic tool 800 to a rotary component. For example, the mounting hardware may include one or more mounting brackets 804, mounting arms 806, etc. to dispose at least a portion of rotary force diagnostic tool 800 (e.g., angular position sensor 108) relative to the rotary component (e.g., steering wheel 102). In this regard, rotary force diagnostic tool 800, via angular position sensor 108, can measure at least angular position of itself relative to a reference and thus of steering wheel 102 or other rotary component.

In an example, rotary force diagnostic tool 800 may include a fixture 104 to which a handle 110 is attached, as described herein. In an example, angular position sensor 108 may be coupled to the fixture 104 or otherwise disposed with respect to steering wheel 102 to allow movement of angular position sensor 108 along with the steering wheel 102 about an axis (e.g., first axis of rotation 114 in FIGS. 1A and 1B).

In an example, angular position sensor 108 may include a gyroscope, as described, to measure angular position of itself, and thus of steering wheel 102. In an example, angular position sensor 108 may include an input to the gyroscope specifying a starting angle, and gyroscope can measure change in angular position from the starting angle. For example, the input may initialize the gyroscope at a reference position (e.g., where the steering wheel 102 is substantially near a neutral position, e.g., a centered or straightened position), and thus the gyroscope may measure a change in angular position of itself from the reference position (e.g., as a negative or positive change measured in degrees, radians, etc.). In an example, the input may be a switch, activation of which can indicate initialization of the gyroscope. In an example, handle 110 may be fixedly mounted to the fixture 104, or rotatably mounted to the fixture 104. Where the handle 110 is rotatably mounted to the fixture 104, in an example, angular position sensor 108 may be mounted to measure angular position of the handle 110 with respect to the fixture, which may correspond to rotation of the steering wheel 102 when operating the rotary force diagnostic tool 800.

In an example, rotary force diagnostic tool 800 may include a cable 810 coupled to force sensor (not shown) to obtain input of a force applied to handle 110, rotation or angular position of the steering wheel 102, etc. In an aspect, however, force sensor (not shown) may wirelessly communicate force data to rotary force diagnostic tool 800 without cable 810. Additionally, in an example, rotary force diagnostic tool 800 may include a display 812 to display the force data communicated by force sensor (not shown), the angular position determined by angular position sensor 108, a representation of a combination thereof (e.g., a metric of force over change in angular position), etc. Moreover, as described further herein, rotary force diagnostic tool 800 may include an output device and/or other mechanism for communicating the force data, angular position, combination thereof, etc. to a steering wheel analyzer 124 or other device to facilitate diagnostics based on the force over change in angular position, etc.

Figure 9:
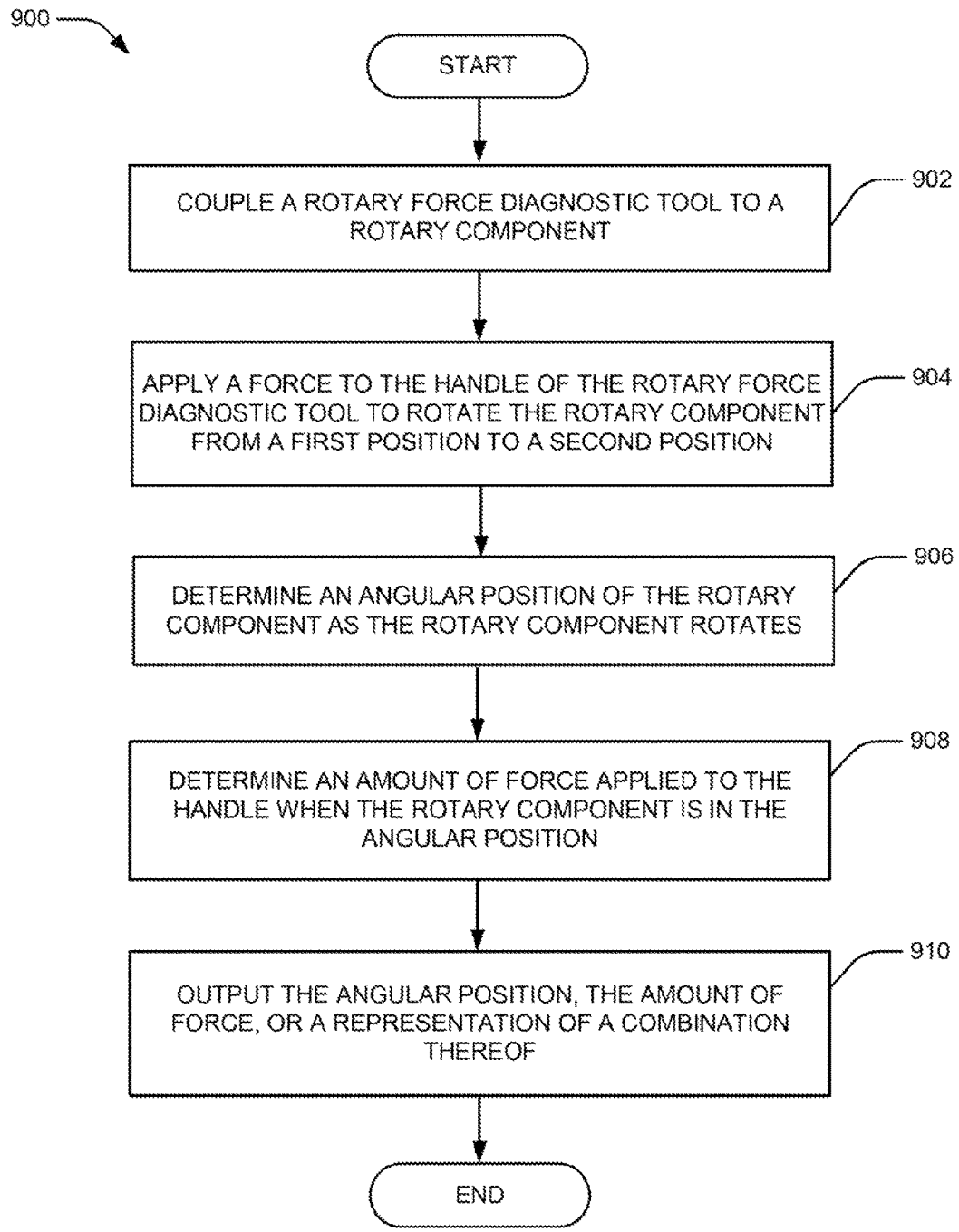
FIGS. 9 and 10 are flowcharts representative of example methods disclosed herein.
Figure 10:
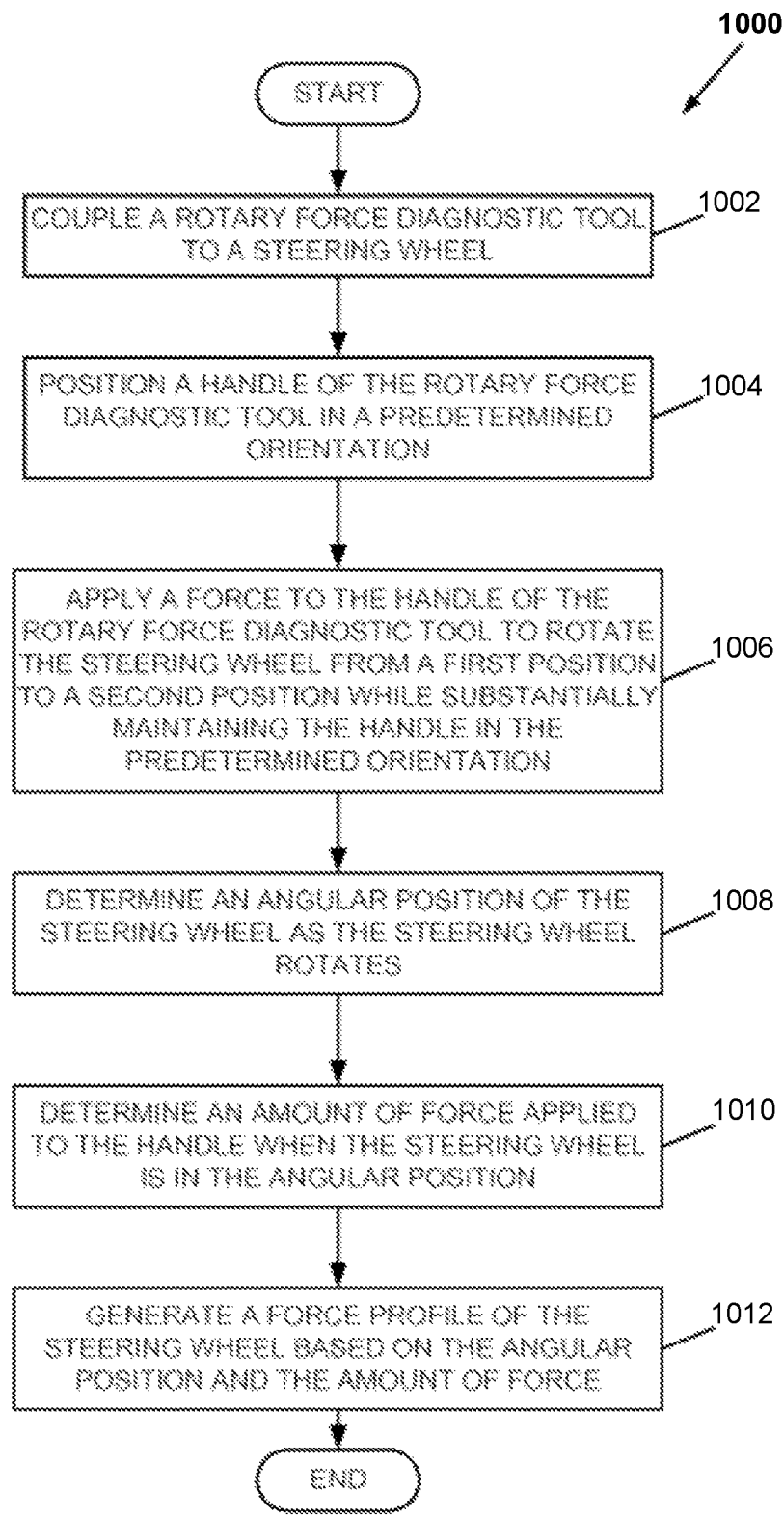

Flowcharts representative of example methods 900 and 1000 to test a rotary component such as, for example, the steering wheel 102 of FIGS. 1A, 1B, 2, 4, 5, 8, etc., is shown in FIG. 8. The methods 900 and 1000 of FIGS. 9 and 10 may be implemented using a program for execution by one or more processors such as a processor 1102 described in more detail below in conjunction with FIG. 11. However, the entire program and/or portions of the program could be executed by one or more additional and/or alternative devices. The program(s) may be stored on a tangible computer readable medium such as a CD-ROM, a hard drive, a flash drive, a digital versatile disk (DVD), or a memory employed by the processor(s). Further, although the methods 900 and 1000 of FIGS. 9 and 10 are described with reference to the flowcharts of FIGS. 9 and 10, other methods of implementing the aspects disclosed herein may be used. For example, the order of the blocks may be different, and/or some of the blocks may be different, eliminated, or combined.

As mentioned above, the example methods 900 and 1000 of FIGS. 9 and 10 may be implemented using computer readable instructions stored on a tangible computer readable medium. As used herein, a tangible computer readable medium is not a propagating signal. Additionally or alternatively, the methods 900 and 1000 of FIGS. 9 and 10 may be implemented using computer readable instructions stored on a non-transitory computer readable medium such as a hard drive, a flash drive, a CD-ROM, and/or any other non-transitory storage media in which information is stored. As used herein, a non-transitory computer readable medium is not a propagating signal.

FIG. 9 is a flowchart representative of an example method 900 to test a rotary component such as, for example, the steering wheel 102 of FIGS. 1A, 1B, 2, 4, 5 and 8. In the aspect of FIG. 9, the method 900 begins when the rotary force diagnostic tool 100, 800 is coupled to the steering wheel 102 (block 902). For example, the fixture 104 may be removably coupled to the steering wheel 102 (e.g., by mounting hardware such as mounting brackets 804, mounting arms 806, etc.). In addition, an angular position sensor 108 can be initialized after coupling the rotary force diagnostic tool 100, 800 to the rotary component such to set a starting point (also described herein as a zero angle, neutral position, center position, etc.) from which the angular position sensor 108 can measure change in angular position.

A force is applied to the handle 400 of the rotary force diagnostic tool 100 to rotate the rotary component from a first position to a second position (block 904). For example, a user gripping the handle 110 may turn the steering wheel 102 in a first direction (e.g., clockwise) or an opposite second direction (e.g., counterclockwise) from the neutral position to a position at a number of degrees and/or rotations away from the neutral position. In some aspects, the user rotates the steering wheel 102 at a substantially constant angular speed such as, for example, ninety degrees per second.

As the steering wheel 102 moves from the first position to the second position, the angular position sensor 108 generates position information, and the force sensor 106 generates force information. As described, the angular position sensor 108 may include a gyroscope that measures change in angular position. The steering wheel position determiner 702 determines one or more angular positions of the rotary component as the rotary component rotates (block 906). In some aspects, the steering wheel position determiner 702 determines the angular positions of the steering wheel 102 relative to the reference position based on an output of the gyroscope. The force determiner 700 determines one or more amounts of force applied to the handle 110 (e.g., via output from force sensor 106) when the rotary component is in the one or more angular positions (block 908). In some aspects, the force profile generator 704 associates the angular positions with a respective amount of force applied to the handle 110 when the steering wheel 102 is at each of the angular positions determined by the steering wheel position determiner 702. The force profile generator 704 outputs the one or more angular positions, the one or more amounts of force, or a combination of a representation thereof (block 910). In some aspects, force profile generator 704 can output a force profile (e.g., such as illustrated via a graph such as, for example, the graph 600 of FIG. 6). In some aspects, the force profile indicates whether the force applied to rotate the steering wheel 102 from the first position to the second position is substantially constant, increases, and/or decreases. For example, force profile generator 704 can output the one or more angular positions, the one or more amounts of force, or a combination of a representation thereof to a display, to another device for output/analysis thereof, etc.

FIG. example 10 is a flowchart representative of an example method 1000 to test a rotary component (e.g., steering wheel) such as, for example, the steering wheel 102 of FIGS. 1A, 1B, 2, 4, 5, and 8. In the aspect of FIG. 10, the method 1000 begins when the rotary force diagnostic tool 100 is coupled to the steering wheel 102 (block 1002). For example, the fixture 104 may be removably coupled to the steering wheel 102 such that the second axis of rotation 116 of the handle 400 is substantially parallel to the first axis of rotation 114 of the steering wheel 102. The handle 400 of the rotary force diagnostic tool 100 is positioned in a predetermined orientation (block 1004). For example, the handle 400 may be held by a user to position the handle 400 in an orientation in which the longitudinal axis 502 of the handle 400 is substantially vertical. In some aspects, a reference position of the angular position sensor 108 is set when the handle 400 is in the predetermined orientation and/or the steering wheel 102 is in a predetermined position.

A force is applied to the handle 400 of the rotary force diagnostic tool 100 to rotate the steering wheel 102 from a first position to a second position while substantially maintaining the handle 400 in the predetermined orientation (block 1006). For example, a user gripping the handle 400 may turn the steering wheel 102 in a first direction (e.g., clockwise) or an opposite second direction (e.g., counterclockwise) from the neutral position to a position at a predetermined number of degrees and/or rotations away from the neutral position. In some aspects, the user rotates the steering wheel 102 at a substantially constant angular speed such as, for example, ninety degrees per second.

As the steering wheel 102 moves from the first position to the second position, the angular position sensor 108 generates position information, and the force sensor 106 generates force information. The steering wheel position determiner 702 determines one or more angular positions of the steering wheel 102 as the steering wheel 102 rotates (block 1008). In some aspects, the steering wheel position determiner 702 determines the angular positions of the steering wheel 102 relative to the reference position. The force determiner 700 determines one or more amounts of force applied to the handle 400 when the steering wheel 102 is in the one or more angular positions (block 1010). In some aspects, the force profile generator 704 associates the angular positions with a respective amount of force applied to the handle 400 when the steering wheel 102 is at each of the angular positions. The force profile generator 704 generates a force profile of the steering wheel 102 based on the one or more angular positions and the one or more amounts of force (block 1012). In some aspects, the force profile is illustrated via a graph such as, for example, the graph 600 of FIG. 6. In some aspects, the force profile indicates whether the force applied to rotate the steering wheel 102 from the first position to the second position is substantially constant, increases, and/or decreases.

Figure 11:
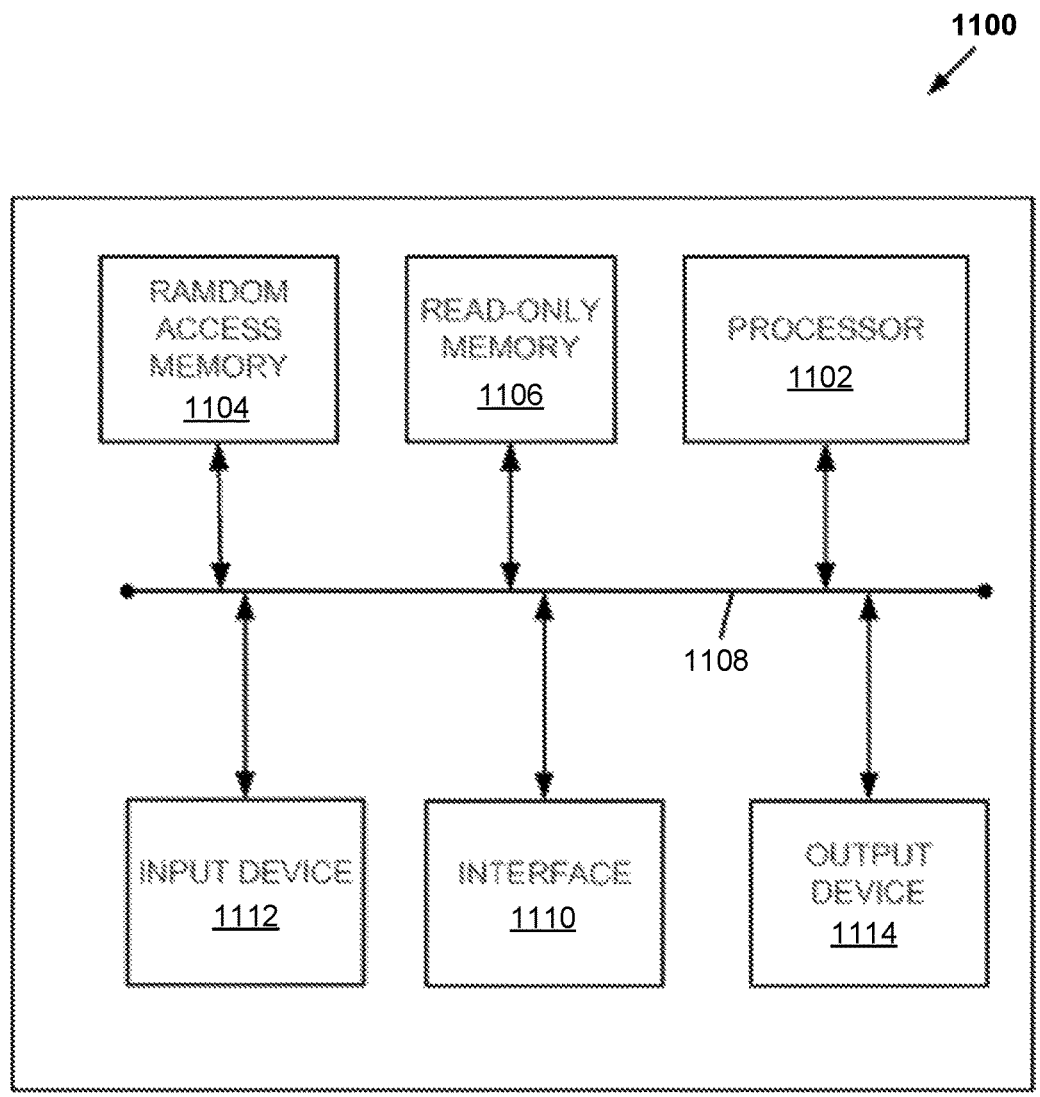
FIG. 11 is a processor platform that may be used to execute machine-readable instructions to implement the aspects disclosed herein.

FIG. 11 is a schematic view of an example processor platform 1100 that may be used to execute instructions to implement the method 1000 of FIG. 10 to implement the force sensor 106, the angular position sensor 108, the force determiner 700, the steering wheel position determiner 702, the force profile generator 704, and/or, more generally, the steering wheel analyzer 124 of FIG. 7. In some aspects, the processor platform 1100 is implemented via one or more general-purpose processors, processor cores, microcontrollers, and/or one or more additional and/or alternative processing devices.

The processor platform 1100 of FIG. 11 includes a programmable, general purpose processor 1102. The processor 1102 executes coded instructions within a random access memory 1104 and/or a read-only memory 1106. The coded instructions may include instructions executable to implement the method 1000 of FIG. 10. The processor 1102 may be any type of processing device, such as a processor core, a processor and/or a microcontroller. The processor 1102 is in communication with the random access memory 1104 and the read-only memory 1106 via a communications bus 1108. The random access memory 1104 may be implemented by any type of random access memory device such as, for example, DRAM, SDRAM, etc. The read-only memory 1106 may be implemented by any type of memory device such as, for example, flash memory. In some aspects, the processor platform 1100 includes a memory controller to control access to the random access memory 1104 and/or the read-only memory 1106. The processor platform 1100 of FIG. 11 includes an interface 1110. The interface 1110 may be implemented by an interface standard such as, for example, an external memory interface, a serial port, a general-purpose input/output, and/or any other type of interface standard. The processor platform 1100 of FIG. 11 includes at least one input device 1112 (e.g., a mouse, a keyboard, a touchscreen, a button, etc.) and at least one output device 1114 (e.g., a display, speakers, etc.) coupled to the interface 1110.

The foregoing description of aspects and examples has been presented for purposes of illustration and description. It is not intended to be exhaustive or limiting to the forms described. Numerous modifications are possible in light of the above teachings. Some of those modifications have been discussed and others will be understood by those skilled in the art. The aspects were chosen and described for illustration of various aspects. The scope is, of course, not limited to the examples or aspects set forth herein, but can be employed in any number of applications and equivalent devices by those of ordinary skill in the art. Rather, it is hereby intended that the scope be defined by the claims appended hereto. Additionally, the features of various implementing aspects may be combined to form further aspects. The word "example" is used herein to mean serving as an example, instance, or illustration. Any aspect or aspect described herein as "example" is not to be construed as preferred or advantageous over other aspects or aspects.

What is claimed is:

1. An apparatus, comprising:
   a fixture for coupling to a rotary component, wherein the rotary component is rotatable between a first rotational position and a second rotational position about an axis;
   a force sensor coupled to the fixture;
   a handle operably coupled to the force sensor to enable the force sensor to measure an amount of force applied to the handle in rotating, via the handle, the rotary component from the first rotational position to the second rotational position;
   an angular position sensor coupled to the fixture and configured to measure an angular position of the rotary component; and
   an output device to output at least one of the amount of force applied to the handle and the angular position of the rotary component.

2. The apparatus of claim 1, wherein the force sensor comprises a load cell.

3. The apparatus of claim 1, wherein the angular position sensor comprises a gyroscope.

4. The apparatus of claim 3, wherein the angular position sensor comprises an input to initialize the gyroscope at a reference position for determining a change in the angular position of the rotary component.

5. The apparatus of claim 1, wherein the handle is one of rotatably coupled or fixedly coupled to the force sensor.

6. The apparatus of claim 1, wherein the force sensor includes a housing and a shaft coupled to the housing.

7. The apparatus of claim 6, wherein the handle is coupled to the shaft to rotate relative to the shaft.

8. The apparatus of claim 1, further comprising a display to display the at least one of the amount of force applied to the handle, the angular position of the rotary component, or the representation of the combination thereof.

9. The apparatus of claim 1, further comprising a force profile generator to generate a force profile based at least in part on receiving the amount of force applied to the handle from the force sensor and the angular position from the angular position sensor.

10. The apparatus of claim 9, wherein the force profile generator generates the force profile as the amount of force applied to the handle over change in the angular position.

11. A method, comprising:
coupling a rotary force diagnostic tool to a rotary component, wherein the rotary component is rotatable between a first rotational position and a second rotational position about an axis;
applying a force to a handle of the rotary force diagnostic tool to rotate the rotary component from the first rotational position to the second rotational position;
determining an angular position of the rotary component as the rotary component rotates from the first position to the second position;
determining an amount of force applied to the handle to rotate the rotary component to the angular position; and
outputting at least one of the amount of force applied to the handle and the angular position of the rotary component.

12. The method of claim 11, wherein determining the amount of force applied to the handle is based at least in part on output from a load cell coupled to the handle.

13. The method of claim 11, wherein determining the angular position is based at least in part on output of the angular position from a gyroscope of the rotary force diagnostic tool.

14. The method of claim 13, further comprising initializing the gyroscope to a reference position to facilitate determining a change in the angular position of the rotary component.

15. The method of claim 11, wherein outputting the at least one of the amount of force applied to the handle, the angular position of the rotary component, or the representation of the combination thereof comprises outputting to a display on the rotary force diagnostic tool.

16. The method of claim 11, wherein outputting the at least one of the amount of force applied to the handle, the angular position of the rotary component, or the representation of the combination thereof comprises outputting a force profile of the amount of force over a change in the angular position of the rotary component.

17. A non-transitory computer-readable medium comprising computer-executable code, the code comprising:
code for determining, from an angular position sensor of a rotary force diagnostic tool coupled to the rotary component, an angular position of the rotary component as the rotary component rotates from a first position to a second position;
code for determining, from a force sensor of the rotary force diagnostic tool, an amount of force applied to a handle of the rotary component to rotate the rotary component to the angular position; and
code for outputting at least one of the amount of force applied to the handle, the angular position of the rotary component, or a representation of a combination thereof.

18. The non-transitory computer-readable medium of claim 17, wherein the angular position sensor is a gyroscope.

19. The non-transitory computer-readable medium of claim 18, further comprising code for initializing the gyroscope to a reference position to facilitate determining a change in the angular position of the rotary component.

20. The non-transitory computer-readable medium of claim 17, wherein the code for outputting outputs the at least one of the amount of force applied to the handle, the angular position of the rotary component, or the representation of the combination thereof to a display on the rotary force diagnostic tool.

* * * * *